United States Patent
Bottorff et al.

(10) Patent No.: US 6,944,163 B2
(45) Date of Patent: Sep. 13, 2005

(54) 10 GIGABIT ETHERNET MAPPINGS FOR A COMMON LAN/WAN PMD INTERFACE WITH A SIMPLE UNIVERSAL PHYSICAL MEDIUM DEPENDENT INTERFACE

(75) Inventors: Paul A. Bottorff, Palo Alto, CA (US); Norival R. Figueira, San Jose, CA (US); David W. Martin, Stittsville (CA); Timothy J. Armstrong, Stittsville (CA); Bijan Raahemi, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 962 days.

(21) Appl. No.: 09/739,385

(22) Filed: Dec. 19, 2000

(65) Prior Publication Data

US 2001/0014104 A1 Aug. 16, 2001

Related U.S. Application Data

(60) Provisional application No. 60/181,549, filed on Feb. 10, 2000.

(30) Foreign Application Priority Data

Feb. 9, 2000 (CA) ............................................. 2298732

(51) Int. Cl.[7] .............................. H04L 12/56; H04J 3/22
(52) U.S. Cl. .................... 370/395.5; 370/466; 370/477; 370/521; 370/545; 375/248
(58) Field of Search ................. 370/351, 395.5–395.65, 370/465–469, 477, 509, 521, 535–537, 545, 901, 907; 375/240

(56) References Cited

U.S. PATENT DOCUMENTS

| | | | |
|---|---|---|---|
| 5,040,170 A | * 8/1991 | Upp et al. | ...................... 398/50 |
| 5,179,555 A | * 1/1993 | Videlock et al. | ............. 370/402 |
| 6,014,708 A | * 1/2000 | Klish | ......................... 709/232 |

(Continued)

FOREIGN PATENT DOCUMENTS

| | | | |
|---|---|---|---|
| CA | 2273522 | 6/1999 | |
| EP | 000693833 A1 | * 1/1996 | .............. H04J/3/16 |
| EP | 001006751 A2 | * 6/2000 | ........... H04Q/11/04 |

(Continued)

OTHER PUBLICATIONS

Unified LAN/WAN PHY Proposal IEEE P802.3 Higher Speed Study Group, Dallas, Texas– (Jan. 18, 2000) Howard Frazier– Cisco Systems, Inc.

Primary Examiner—Hassan Kizou
Assistant Examiner—Gregory Sefcheck
(74) Attorney, Agent, or Firm—Pearne & Gordon LLP

(57) ABSTRACT

An Ethernet mapping enables high speed Ethernet data streams having a data rate of 10 Gb/s to be transported across a synchronous packet switched network fabric having a standard SONET OC-192 line rate of 9.953280 Gbaud. The 10 Gb/s Ethernet data stream is compressed by removing interframe gaps between successive MAC frames to produce a compressed data stream, which is then mapped to a synchronous container. The synchronous container is then launched across the synchronous packet switched network fabric at a standard SONET OC-192 line rate of 9.953280 Gbaud. The synchronous container is preferably provided as a stripped STS-192c frame having only A1 and A2 octets of the Transport Overhead (TOH). The compressed data stream is mapped directly to the synchronous container, starting at the first octet following the A1 and A2 octets, without first being inserted into a conventional STS-192c SPE, so that most of the space normally used for TOH and Path overhead (POH) within a conventional STS-192c frame is freed-up for carrying the compressed data stream. At a receiving interface, the compressed data stream is extracted from received synchronous containers and decompressed, by insertion of interframe gaps between successive MAC frames, to generate a recovered 10 Gb/s Ethernet data stream. The starting bit of each successive MAC frame can be identified by examination of the length field of the immediately previous MAC frame.

41 Claims, 8 Drawing Sheets

U.S. PATENT DOCUMENTS

| | | | |
|---|---|---|---|
| 6,389,036 B1 * | 5/2002 | Stewart et al. | 370/466 |
| 6,414,966 B1 * | 7/2002 | Kulkarni et al. | 370/465 |
| 6,496,519 B1 * | 12/2002 | Russell et al. | 370/465 |
| 6,567,413 B1 * | 5/2003 | Denton et al. | 370/465 |
| 6,608,834 B1 * | 8/2003 | Lewin et al. | 370/395.53 |
| 6,636,529 B1 * | 10/2003 | Goodman et al. | 370/469 |
| 6,658,021 B1 * | 12/2003 | Bromley et al. | 370/466 |
| 6,704,326 B2 * | 3/2004 | Russell et al. | 370/466 |
| 2002/0037018 A1 * | 3/2002 | Lentine et al. | 370/521 |
| 2002/0181499 A1 * | 12/2002 | Kfir et al. | 370/466 |

FOREIGN PATENT DOCUMENTS

| | | | | |
|---|---|---|---|---|
| WO | WO0074282 A2 * | 5/2000 | | H04J/3/00 |
| WO | WO0074286 A1 * | 12/2000 | | H04J/3/16 |

* cited by examiner

Figure 7

| | Prior Art | LAN PHY Dual Scrambler | Prior Art | WAN PHY Dual Scrambler |
|---|---|---|---|---|
| MAC/XGMII data rate | 10 Gb/s | 10 Gb/s | 9.29419 Gb/s | 9.58464 Gb/s |
| Serial Signal Rate | 10.3125 Gbaud | 9.95328 Gbaud | 9.95328 Gbaud | 9.95328 Gbaud |
| 4λ or 4x parallel signal rate | 2.578125 Gbaud ? | 2.48832 Gbaud | 2.578125 Gbaud ? | 2.48832 Gbaud |

10 GIGABIT ETHERNET MAPPINGS FOR A COMMON LAN/WAN PMD INTERFACE WITH A SIMPLE UNIVERSAL PHYSICAL MEDIUM DEPENDENT INTERFACE

CROSS-REFERENCE TO RELATED APPLICATIONS

This application is based on U.S. Provisional Application Ser. No. 60/181,549, filed Feb. 10, 2000.

MICROFICHE APPENDIX

Not Applicable.

TECHNICAL FIELD

The present invention relates to high-speed data communications networks, and in particular to a method and apparatus for interfacing adjacent high-speed data communications networks.

BACKGROUND OF THE INVENTION

Applicant's co-pending Canadian Patent Application Serial No. 2,273,522 proposes a technique of mapping high speed (HS) Ethernet frames (e.g. originating in a local area network [LAN] using a fiber distributed data interface [FDDI] physical layer) into a synchronous container (e.g. thin synchronous optical network [SONET] STS-192C or synchronous digital hierarchy [SDH] VC-4-64C frames) for transport across a synchronous packet switched network fabric at a standard OC-192 line rate of 9.95328 Gbaud, to achieve a data rate of 9.5864 Gb/s. This data rate is obtained independently of the LAN/MAN/WAN configuration of the network. The use of standard line rates in all configurations means that a common physical medium dependent (PMD) interface can be used, which reduces costs by permitting increased economies of scale. Additionally, conventional SONET/SDH routing systems (e.g. routers, cross-connects and add-drop multiplexors) can be used to transport data traffic in all configurations. Despite its versatility, the technique of Canadian Patent Application Serial No. 2,273,522 is unattractive for use in LAN configurations, because HS Ethernet LANs commonly provide a data rate of 10 Gb/s. As a result, implementation of this technique in LAN configurations would have the effect of degrading overall data performance.

An alternative protocol has recently been proposed for mapping HS Ethernet frames into synchronous containers, that is intended to achieve a data rate of 10 Gb/s for LAN configurations. However, in order to obtain this data rate, the synchronous container must be transmitted at an accelerated line rate of 10.3125 Gbaud. This non-standard line rate means that conventional SONET/SDH routing systems cannot readily be used in LAN configurations. Furthermore, the use of an accelerated line rate reduces data transmission reliability. According to this proposal, the standard OC-192 line rate of 9.95328 Gbaud is used for WAN configurations. However, the use of different line rates for LAN and WAN configurations means that respective different PMD interface devices must be used for each configuration. This latter requirement increases costs by reducing economies of scale.

Accordingly, a method and apparatus of mapping high-speed (HS) Ethernet signals to a synchronous container for transport across a synchronous packet-switched network fabric, which enables an Ethernet data rate of 10 Gb/s in LAN configurations of the network, while using a standard OC-192 line rate of 9.95328 Gbaud, remains highly desirable.

SUMMARY OF THE INVENTION

An object of the present invention is to provide a method and apparatus for mapping Ethernet frames to a synchronous container such that an Ethernet data rate of 10 Gb/s in LAN configurations can be obtained at a standard line rate of 9.95328 Gbaud.

Another object of the present invention is to provide a method and apparatus for mapping Ethernet frames to a synchronous container such that a common physical medium dependent (PMD) interface can be used independently of a LAN/WAN configuration of the network.

Accordingly, an aspect of the present invention provides a method of transporting a high speed Ethernet data stream comprising a sequential series of media access control (MAC) frames and having a data rate of 10 Gb/s across a synchronous packet switched network fabric having a line rate of 9.953280 Gbaud. The method comprises the steps of: at a sending interface: providing a synchronous container; compressing the Ethernet data stream to produce a compressed data stream; mapping the compressed data stream to the synchronous container; and launching the synchronous container across the network fabric. At a receiving interface: the compressed data stream is extracted from the synchronous container; and the compressed data stream is decompressed to generate a recovered Ethernet data stream.

A further aspect of the present invention provides a method of interfacing a local area network (LAN) having a 10 Gb/s data rate and a synchronous packet switched physical network fabric having a line rate of 9.953280 Gbaud. The method comprises the steps of: receiving an Ethernet data stream comprising a sequential series of media access control (MAC) frames; compressing the Ethernet data stream; and mapping the compressed Ethernet data stream to a synchronous container.

Another aspect of the present invention provides an interface for coupling a local area network (LAN) having a 10 Gb/s data rate to a synchronous packet switched physical network fabric having a line rate of 9.953280 Gbaud. The interface comprises: means for receiving an Ethernet data stream comprising a sequential series of media access control (MAC) frames; means for compressing the Ethernet data stream; and means for mapping the compressed Ethernet data stream to a synchronous container.

In embodiments of the invention, the synchronous container comprises: a line/column frame format conforming to a conventional synchronous optical network (SONET) frame format; and a stripped transport overhead (TOH). The frame format of the synchronous container may conform to a SONET synchronous transport signal-level 192 (STS-192) frame format. The stripped TOH may comprise only A1 and A2 octets of a conventional SONET frame TOH. In such cases, the stripped TOH preferably comprises a predetermined number (e.g. at most 24) of each of the A1 and A2 octets.

In embodiments of the invention, the step of compressing the Ethernet data stream comprises removing an inter-frame gap (IFG) between successive MAC frames. Idle MAC frames may also be removed from the Ethernet data stream.

The compressed data stream may be mapped to the synchronous container by adding successive frames of the compressed data stream directly to the SONET/SDH frame. In such cases, successive MAC frames of the compressed data stream are preferably added to the synchronous container starting immediately following the stripped TOH.

In some embodiments of the invention, the synchronous container may be launched into the network fabric by inverse multiplexing the synchronous container into a plurality of data streams, which are then launched into a respective plurality channels of the network fabric. In such cases, receiving the synchronous container includes receiving a respective data stream through each one of the plurality of channels. The received data streams are then aligned, and multiplexed to recover the synchronous container.

In embodiments of the invention, the compressed data stream is extracted from the synchronous container by: synchronizing a read clock with the synchronous container; and reading successive MAC frames of the compressed data stream from the synchronous container starting immediately following the stripped TOH. The read clock can be synchronized with the synchronous container by detecting a transition between the A1 and A2 octets.

The compressed data stream may be decompressed by inserting an inter-frame gap (IFG) between successive MAC frames. Insertion of an IFG between successive MAC frames may be accomplished by: monitoring a preamble portion of a first MAC frame; reading a length of a data portion of the first MAC frame from the monitored preamble portion, to identify a trailing byte of the first MAC frame; and inserting an idle MAC frame into the compressed stream immediately following the identified trailing byte.

An advantage of the present invention is that a common physical medium dependent (PMD) interface can be used, independently of the LAN/MAN/WAN configuration of the network, while ensuring a reliable 10 Gb/s data rate in the LAN configuration.

BRIEF DESCRIPTION OF THE DRAWINGS

Further features and advantages of the present invention will become apparent from the following detailed description, taken in combination with the appended drawings, in which:

FIG. 7 is a table showing a comparison between data and line rates obtained using the prior art interface of FIG. 2 and the present invention.

It will be noted that throughout the appended drawings, like features are identified by like reference numerals.

DETAILED DESCRIPTION OF THE PREFERRED EMBODIMENT

Figure 1:
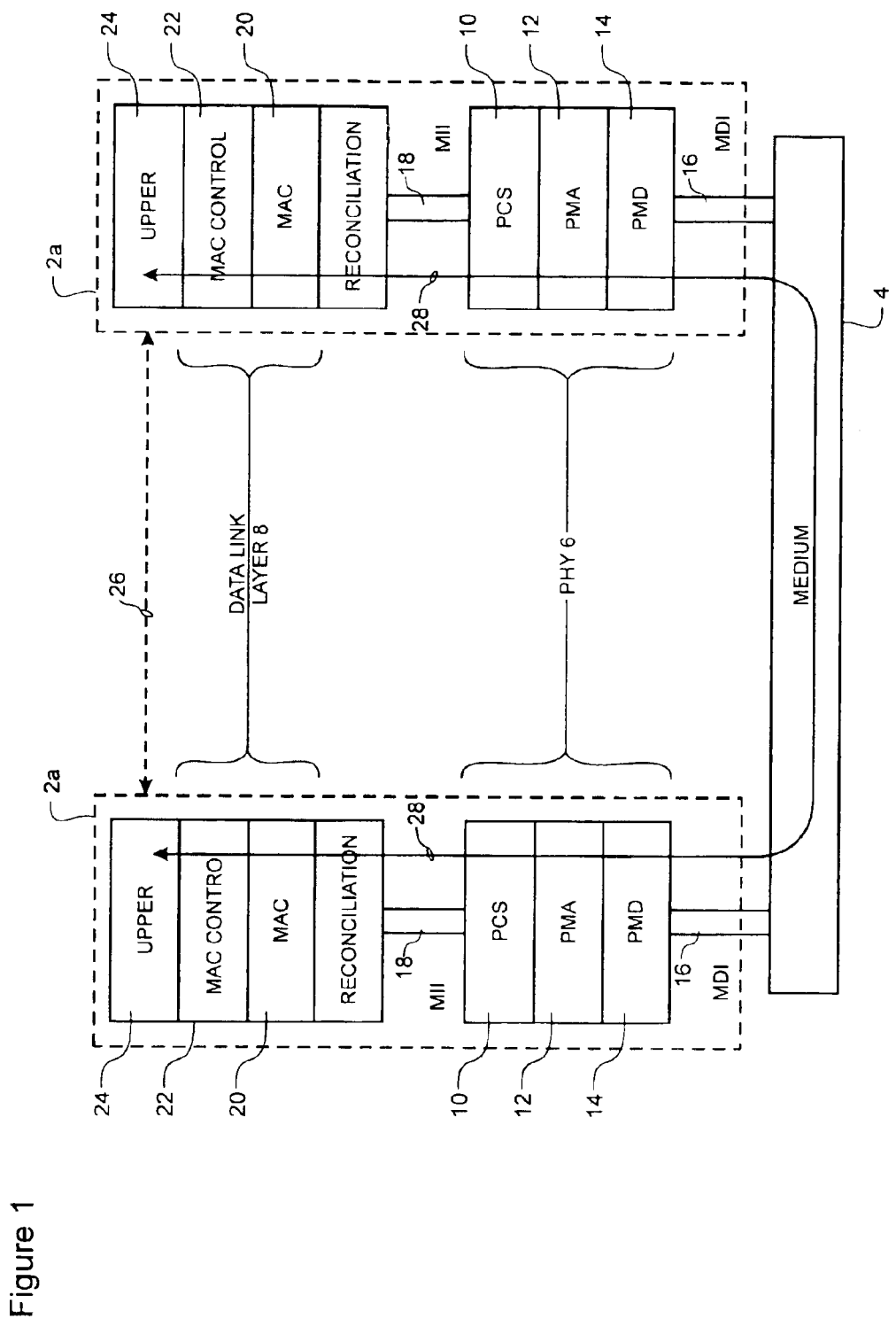
FIG. 1 is a block diagram illustrating a communications network including a pair of network nodes connected by a network medium, in which the present invention may be deployed.

FIG. 1 illustrates a communications network including a pair of nodes 2a, 2b (such as personal computers and LAN servers) connected for data communications through a network medium 4. The nodes 2a, 2b are represented by the standard Ethernet reference model which utilizes a multi-layer architecture made up of a physical layer (PHY) 6 and a data link layer 8. The PHY 6 is divided into three sub-layers, namely a physical coding sub-layer (PCS) 10, a physical medium attachment (PMA) sub-layer 12, and a physical medium dependent (PMD) sub-layer 14. A Medium Dependent Interface (MDI) 16 couples the PHY 6 to the medium 4 (i.e. the network fabric). A Medium Independent Interface (MII) 18 couples the PHY 6 to the data link layer 8, which is composed of Media Access Control (MAC) 20 and (optionally) MAC control 22 sub-layers. Upper layers 24 containing, for example, end-user software applications (not shown) are coupled to the data link layer 8 to facilitate communications between each node 2. This reference model renders the PHY 6 and medium 4 effectively transparent to upper-layer software applications, which are therefore enabled to communicate with each other using a common communications protocol that is independent of the medium 4. In FIG. 1, this is illustrated by a dashed line indicating a direct virtual connection 26 between applications in the upper layer 24. The actual flow of data between the upper layer applications follows a path 28 extending from the upper layer 24 of one node 2a, down through the data link layer 8 and PHY 6 of the device 2a, through the medium 4, and upwards through the PHY 6 and data link layer of the other node 2b.

In general, the medium 4 provides the network fabric, including physical links (not shown) and switching (and or routing) systems (not shown) which enable the physical transport of data between nodes 2a, 2b connected to the network. The medium 4 may be configured as a wide area network (WAN) or a local area network (LAN), and may use any one of a variety of physical transport technologies (e.g. fiber-optics, copper, or twisted pair) and protocols (such as synchronous optical network [SONET], synchronous digital hierarchy [SDH], and Fiber Distributed Data Interface [FDDI]).

Local area networks (LANs) are commonly employed to connect general purpose computers (e.g. hosts or clients) and special purpose computers (e.g. servers) to provide communal file storage and access, e-mail services, etc. The oldest and best known LAN technology is the Ethernet, which in many cases operates on a fiber distributed data interface (FDDI) PHY 6 using a common bus optical fiber medium 4.

A wide area network (WAN) is typically a packet switched data network that connects various packet switching nodes (e.g. routers, cross-connects and add-drop multiplexors) and transmission facilities to end-user communications devices (e.g. concentrator access switches or service provider routers). A WAN differs from a LAN in geographic coverage, data rates, and also in data transport technology. In the current network space, a popular WAN technology is based on the SONET/SDH protocol using an optical fiber medium configured for Wave Division Multiplex (WDM) or Dense Wave Division Multiplex (DWDM) data transport.

A metropolitan area network (MAN) is generally intended to serve network requirements that are geographically larger than a LAN, and smaller than a WAN. For example, a MAN may be used to provide a high band-width backbone inter-connecting distributed LANs. This type of application is typical of campus networks, where semi-autonomous LANs in multiple buildings are interconnected by a MAN to facilitate inter-building communications. In view of increasing complexity of communications requirements, MANs are tending to evolve toward the adoption of WAN technology (e.g. SONET/SDH over DWDM optical fiber medium). Accordingly, for the purposes of the present application, MANs are considered to be a subset of WANs, and references to WANs herein should be understood to also refer to MANs.

The desirability of using a packet switched routing technology (e.g. SONET/SDH over WDM or DWDM optical fiber medium) as the medium 4 for both LAN and WAN network configurations is well recognized. However, in a high speed data network environment, achievement of this goal is complicated by the fact that high speed Ethernet LANs typically achieve a 10 Gb/s data rate (in the data link layer 8 and upper layer 24), whereas the packet switched data network operating under the SONET/SDH protocol uses an OC-192 line rate of 9.95328 Gbaud to obtain a payload data rate of 9.58464 Gb/s. In order to carry Ethernet traffic across a packet switched network medium, it is necessary to resolve this difference between the Ethernet data rate in the data link layer 8 and the payload rate within the medium 4.

Figure 2:
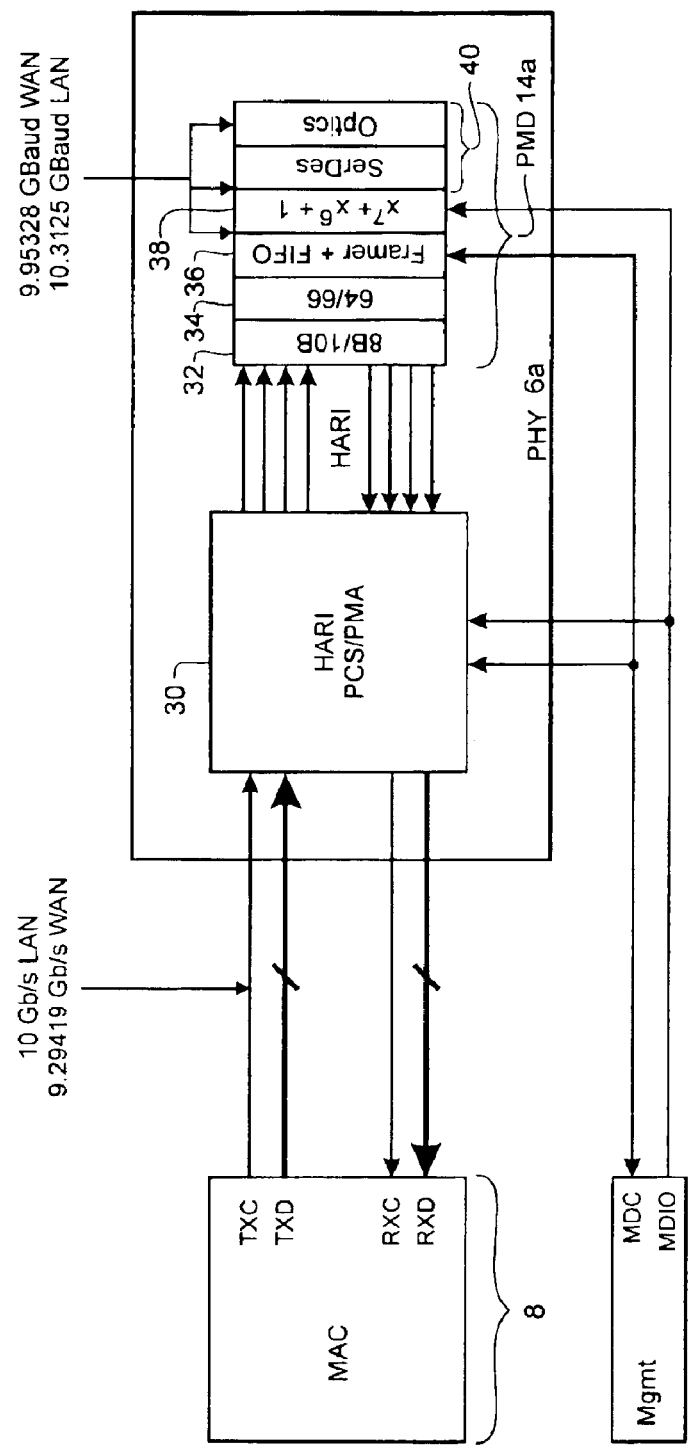
FIG. 2 is a block diagram schematically illustrating a prior art physical layer interface.

FIG. 2 schematically shows a prior art physical layer interface for coupling high speed Ethernet traffic to a SONET/SDH packet switched network medium 4. As shown in FIG. 2, the conventional PCS 10 and PMA 12 are grouped together as a combined PCS/PMA HARI 30 which mediates data transport between the (conventional) data link layer 8 and a modified PMD sub-layer 14a. The HARI 30 exchanges data with the modified PMD 14a using 4 parallel data channels (in each direction) operating at a line rate of 3.125 Gbaud. The modified PMD 14a is subdivided into 8B/10B and 64/66 encoding layers 32,34; a framer FIFO 36; a scrambler 38; and a conventional electron/optical conversion layer 40. Thus in the prior art device of FIG. 2, much of the data encoding, framing, and scrambling functionality conventionally performed in the PCS 10 and PMA 12 are relocated into the PMD 14a. The PMD 14a is designed to operate in one of two modes depending on the LAN/WAN configuration of the network (see FIG. 7). In particular, in a LAN configuration, this interface is intended to achieve a data rate in the data link layer 8 of 10 Gb/s, in conformance with the high speed Ethernet standard. In order to obtain this data rate, the framer FIFO 36, scrambler 38 and converter 40 of the PMD 14a (and medium 4) is operated at a line rate of 10.3125 Gbaud. This line rate is significantly higher than that supported by the SONET/SDH standard, which precludes the use of conventional (and legacy) SONET/SDH routing systems within the network medium 4.

In contrast, in a WAN configuration, the framer FIFO 36, scrambler 38 and converter 40 of the PMD 14 and medium 4 are operated at the standard SONET/SDH line rate of 9.95328 Gbaud, which means that conventional and legacy SONET/SDH routing systems may be used in the medium 4. However, in this configuration, the data rate (in the data link layer 8) is reduced to 9.29419 Gb/s, which is somewhat lower than is normally expected based on the payload rate of conventional SONET/SDH signals. Additionally, the use of different line rates for LAN and WAN configuration implies that different devices must be used for the PMD layer 14a in each configuration, which leads to increased costs.

The present invention provides a unified PHY 6b which allows the PMD 14 and medium 4 to operate at the standard OC-192 line rate of 9.95328 Gbaud while providing a standard Ethernet data rate (in the data link layer 8) of 10 Gb/s in LAN configurations and a SONET/SDH standard 9.58464 Gb/s in WAN configurations. Features and operations of an exemplary embodiment of the present invention are described below with reference to FIGS. 3 through 7. Alternative embodiments of the present invention will then be described with reference to FIG. 8.

Figure 3:
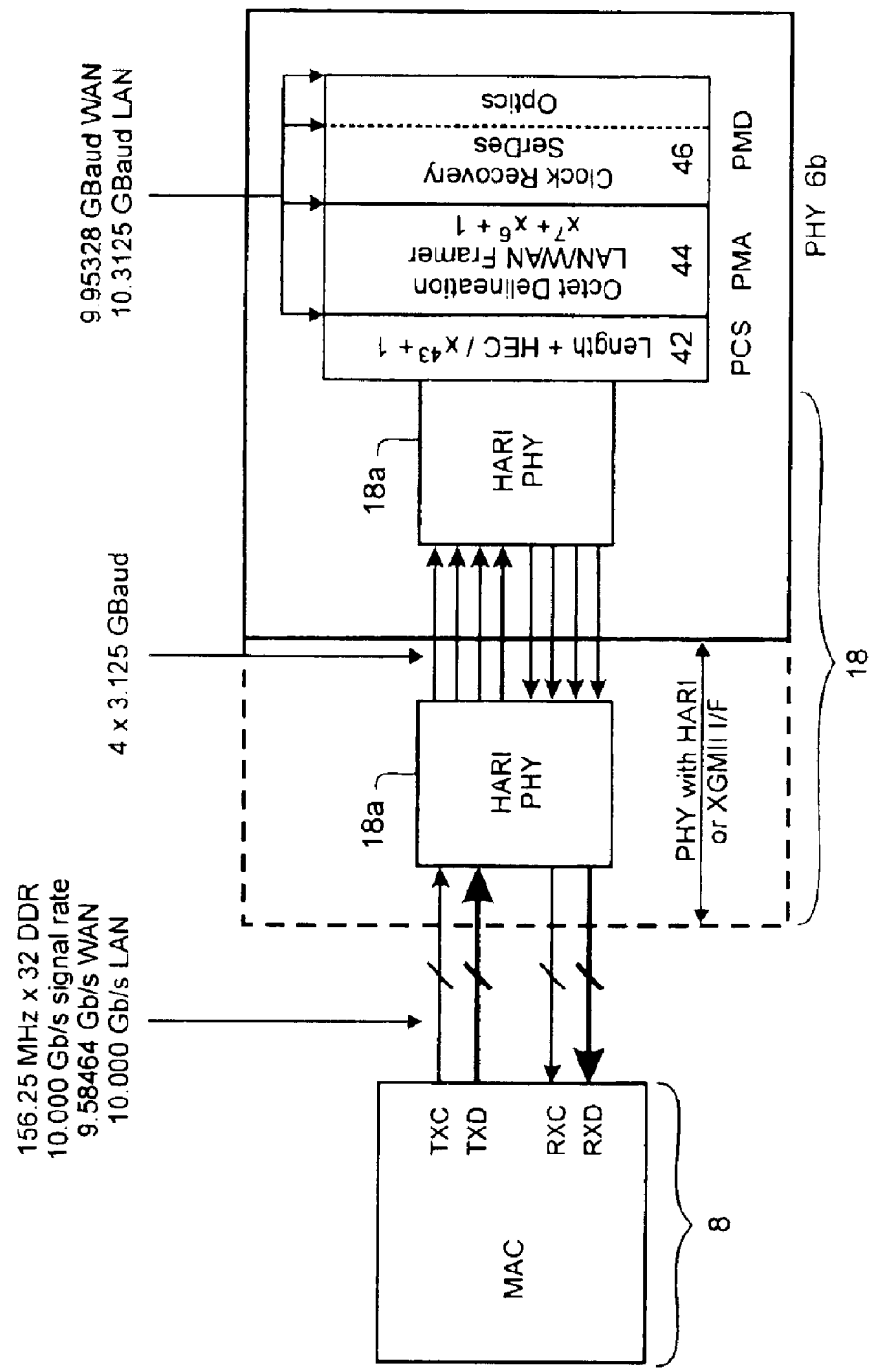
FIG. 3 is a block diagram schematically illustrating a physical layer interface in accordance with an embodiment of the present invention.

FIG. 3 illustrates a unified PHY 6b in accordance with a first embodiment of the present invention. The unified PHY 6b is constructed using a layered model similar to the Ethernet reference model shown in FIG. 1. Thus the PHY 6b is composed of a physical coding sub-layer 42, a physical medium attachment sub-layer 44, and a physical medium dependent sub-layer 46. The physical coding sub-layer 42 is coupled to the data link layer 8 via a conventional medium independent interface 18, which may include one or more HARI interface devices 18a. Data transport through the medium independent interface 18 may be accomplished using a four lane data bus running at 3.125 Gbaud per lane and/or a thirty-two lane data bus running at 156.25 MHz, to transfer an Ethernet data stream consisting of MAC frames and delivering a data rate of 9.58464 Gb/s in WAN configurations and 10 Gb/s in LAN configurations. The operations of the data link layer 8 and MII 18 are known in the art and therefore will not be described in detail herein. Similarly, the PMD sub-layer 46, which is coupled to the data transport medium 4 of the network, operates to perform electrical/optical signal conversion at an OC-192 line rate of 9.95328 Gbaud in a conventional manner, and thus will not be described in greater detail. The PCS 42 and the PMA sub-layer 44 respectively operate to perform MAC packet delineation, and insertion/extraction of MAC packets into and from synchronous containers, to enable transport through the packet switched data network medium 4. These layers also function to perform a double scrambling of data streams to improve system performance in a manner known in the art. Like the PMD sub-layer 46, both the PCS 42 and the PMA sub-layer 44 operate at a line rate of 9.95328 Gbaud.

In accordance with the present invention, the manner in which Ethernet data streams are processed by the PCS 42, and the PMA sub-layer 44 is controlled based on the LAN or WAN configuration of the network. In particular, in a WAN configuration of the network, the PCS 42 performs signal scrambling in a conventional manner to produce a PCS data stream. The PMA sub-layer 44 then operates to map the PCS data stream into a conventional SONET synchronous payload envelope (SPE), which is inserted into a conventional synchronous container (e.g. an STS-192 frame) for transmission through the network medium 4 in a conventional manner. Conversely, in a LAN configuration of the network, the PCS 42 operates to produce the PCS data stream by compressing the Ethernet data stream, in addition to the conventional scrambling step. The PMA sub-layer 44 then maps this compressed PCS data stream into a stripped synchronous container for transport through the network medium 4. Selection of the mode of operation (e.g. for LAN or WAN network configurations) can be made by provisioning at the time of installation of the PHY 6b, or alternatively by means of an auto detection algorithm following power up of the PHY 6b. Operation of the PCS 42 and the PMA sub-layer 44 in each of these modes is described in greater detail below with reference to FIGS. 4 through 7.

Figure 4:
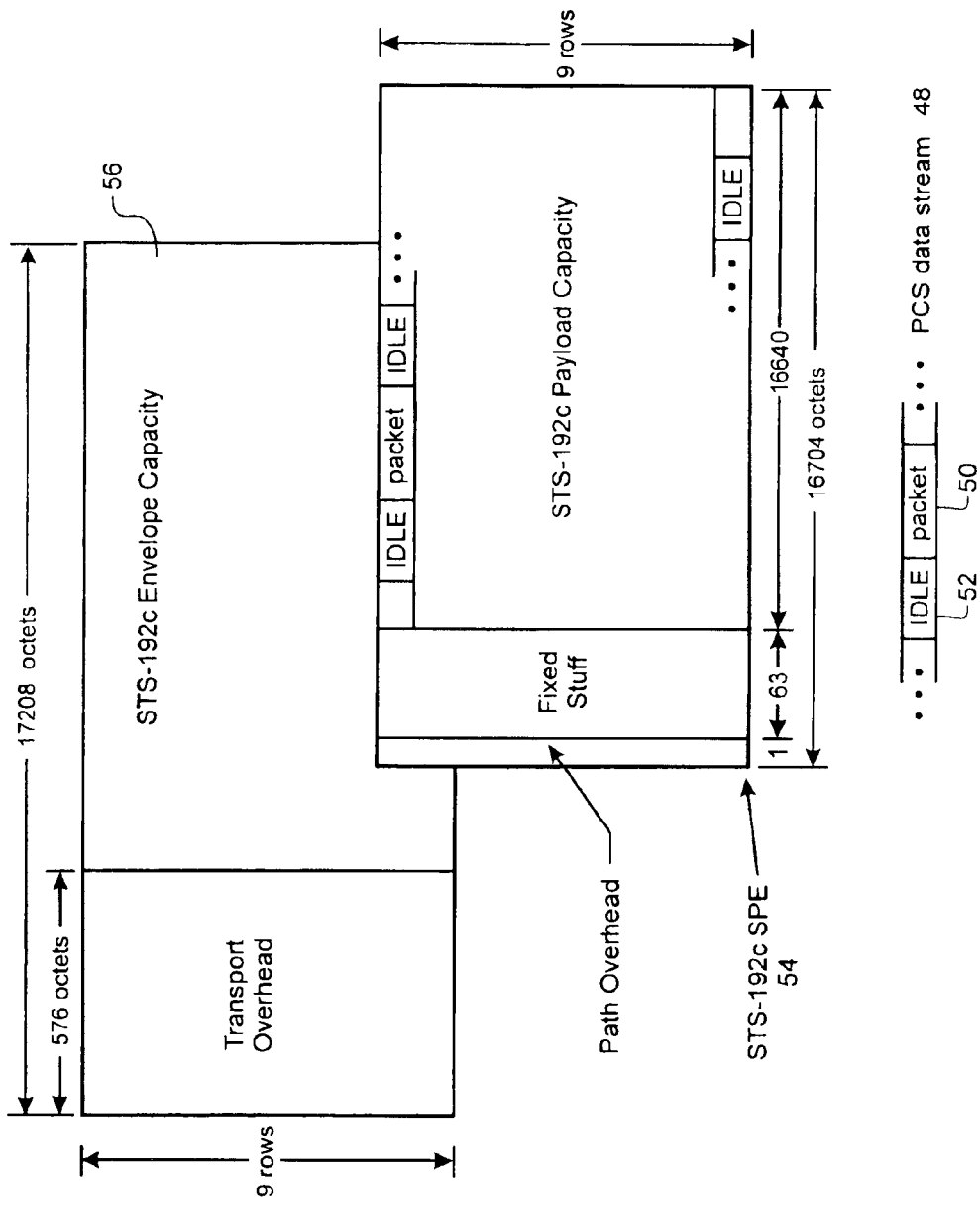
FIG. 4 schematically illustrates encapsulation of Ethernet data streams in a synchronous container for transport through a WAN configured physical network fabric in accordance with an embodiment of the present invention.

FIG. 4 illustrates the operation of the unified PHY 6a in a WAN configuration of the network. In this mode of operation, an outgoing Ethernet data steam is processed by the PCS 42 (e.g. $x^{43}+1$ scrambling) in a conventional manner to produce a PCS data stream 48 composed of a sequential series of MAC packets 50 separated by idle frames 52. The PCS data stream 48 is then forwarded to the PMA sub-layer 44 which performs a second scrambling of the PCS data stream 48 (e.g. with $x^7+x^6+1$) in a conventional manner, before mapping the scrambled data stream into a synchronous payload envelope (SPE) 54. The SPE 54 is then inserted in a synchronous container 56 (e.g. an STS-192 frame) for transport through the network medium 4. As may be seen in FIG. 4, the construction of the synchronous container 56 and the SPE 54 conform to the SONET/SDH standard so that the synchronous container 56 can be transported through the network medium 4 using conventional (and legacy) SONET/SDH technology and transmission facilities.

The processing of synchronous containers 56 received by the PHY 6b is substantially the reverse of that described above. Thus the PMA sub-layer 44 processes each received synchronous container 56 to extract its payload data as a data stream. This data stream is then de-scrambled (e.g. using $x^7+x^6+1$) to recover the original PCS data stream 48, which is then passed to the PCS 42.

The PCS 42 then processes the PCS data stream 48 by performing a second de-scrambling step (e.g. using $x^{43}+1$) and MAC packet delineation to generate a recovered Ethernet data stream which is passed to the data link layer 8 via the MII 18.

From the above description, it will be seen that for a WAN configuration of the network, the data throughput performance will be compatible with the payload rate of the packet switched data network. In the case of a SONET/SDH network operating at an OC-192 line rate of 9.95328 Gbaud, the synchronous container 56 can conveniently be an STS-192 frame, and the payload rate of the associated STS-192 SPE 54 will translate into a data rate of 9.58464 Gb/s. As may be seen in FIG. 7, this data rate is higher than the data rate of 9.29419 Gb/s obtained by the prior art interface illustrated in FIG. 2 in WAN configurations.

Figure 5:
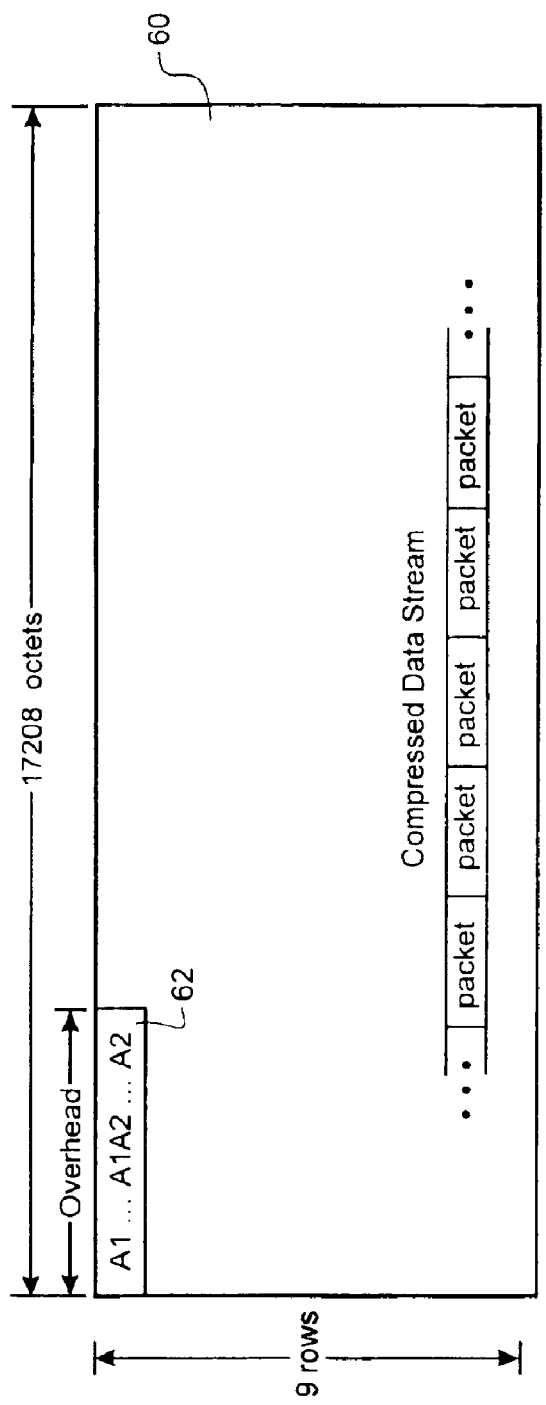
FIG. 5 schematically illustrates encapsulation of Ethernet data streams in a synchronous container for transportation through a LAN configuration physical network fabric in accordance with an embodiment of the present invention.
Figure 6:
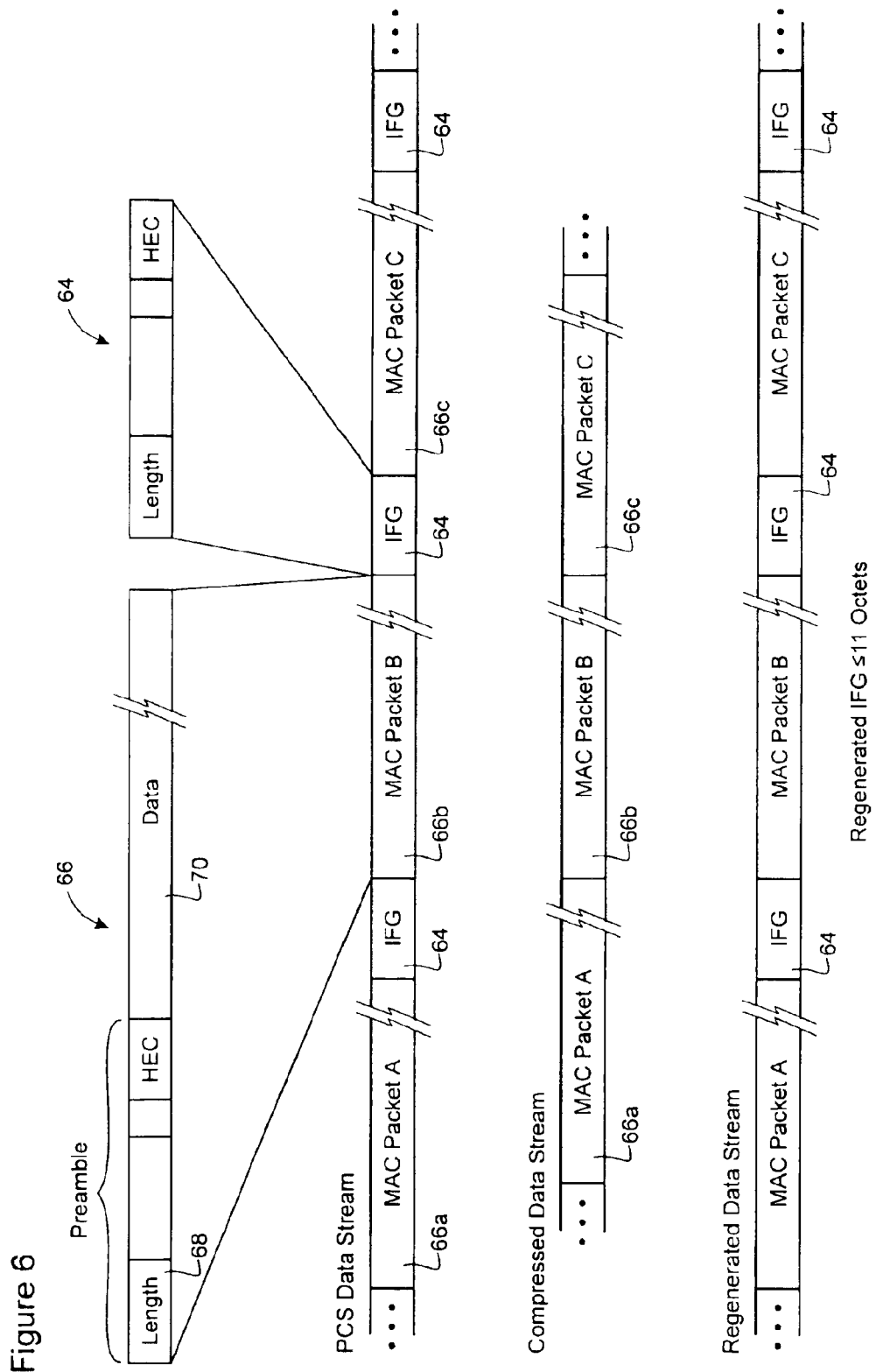
FIGS. 6a and 6b schematically illustrate compression and decompression of Ethernet data streams usable in conjunction with the embodiment of FIG. 5.

FIGS. 5 and 6 illustrate operation of the PHY 6b in LAN configurations of the network. FIG. 5 illustrates a synchronous container 60 usable for transportation of payload data through the network medium 4 in this mode of operation. The synchronous container 60 is formed as a stripped STS frame, in that it retains the row and column format of a conventional STS frame. However, most of the octets of the conventional transport overhead (TOH) have been removed. In the illustrated embodiment, only the A1 and A2 octets 62 of a conventional frame transport overhead are provided in the synchronous container 60. The A1 and A2 octets 62 are sufficient to enable routing of the synchronous container 60 through the network medium 4, as well as synchronization and octet delineation of received containers. Because all routing through the network medium 4 is point-to-point in LAN configurations, all of the payload data inserted into a synchronous container 60 is destined for a single destination node on the network. Routing of individual MAC packets to MAC addresses subtending the destination node is handled by data link layer 8 processing within the destination node. Accordingly, the path overhead and fixed stuff normally incorporated within an STS frame is not required. As a result, the use of a synchronous payload envelope is also not required for this mode of operation.

In order to maximize utilization of the synchronous container 60, the compressed data stream received from the physical coding sub-layer 42 is mapped directly into the synchronous container 60, starting at the first octet following the A1 and A2 octets 62, without first being inserted into a Synchronous Payload Envelope (SPE). As a result, space normally used for TOH and Path overhead (POH) within a conventional STS-192c frame is freed-up for carrying the compressed data stream.

A further increase in the data rate is obtained by compressing the Ethernet data stream within the PCS 42 (in addition to the conventional scrambling step) to generate a compressed PCS data stream. In general, this can be accomplished by processing the Ethernet data stream to eliminate the inter-frame gap 64 which normally separates successive MAC packets 66. As a result, MAC packets are inserted (following scrambling) into the synchronous container 60 back-to-back, with no dead space between the last bit of one packet 66a and a first bit of a successive packet 66b. A further compression of the PCS data stream can be accomplished by processing the data stream to eliminate idle MAC packets (i.e. MAC packets in which the data field is empty) so that each MAC packet 66 inserted into the synchronous container 60 includes payload data. Following insertion of the compressed PCS data stream into the synchronous container 60, the synchronous container 60 can be transported through the network medium 4 at a conventional OC-192 line rate of 9.95328 Gbaud. However, by maximizing utilization of the synchronous container 60, coupled with compression of the Ethernet data stream, a data rate of 10 Gb/s (in the data link layer 8) can be achieved. As can be seen in FIG. 7, this data performance compares favorably with the prior art interface shown in FIG. 2, which required a line rate of 10.3125 Gbaud to obtain a data rate of 10 Gb/s in LAN configurations.

Processing of received synchronous containers to obtain a recovered Ethernet data stream is substantially the reverse of that described above. Thus, upon reception of a synchronous container 60, the PMA layer 44 extracts the payload data from the synchronous container 60 as a serial data stream starting immediately following the A1 and A2 octets 62 of the container 60. The serial data stream is then de-scrambled (e.g. using $x^7+x^6+1$) and passed to the PCS 42 as a recovered compressed PCS data stream. Within the PCS 42 the compressed PCS data stream is decompressed by insertion of an inter-frame gap (of, for example, 11 octets) between successive MAC frames to produce a regenerated PCS data stream which can be de-scrambled a second time (e.g. using $x^{43}+1$) to produce the regenerated Ethernet data stream.

As shown in FIG. 6, compression and decompression of the PCS data stream can be accomplished by examining the length field 68 of the preamble of each MAC packet 66, which is conventionally used to specify the length of the data field 70 of the respective MAC packet 66. Thus idle packets and inter-frame gaps can be identified by a zero value in the length field 68, thereby allowing such idle packets and inter-frame gaps to be dropped from the PCS data stream. Once this has been accomplished, the compressed PCS data stream comprises a serial sequence of data-carrying MAC packets 66 lying back-to-back. This stream can be subsequently decompressed by again examining the length field 68 of the MAC packet preamble. Because the preamble is of a known predetermined length, the value contained in the length field 68 can be used as a pointer to the first bit of the next successive MAC packet 66. Thus as the regenerated compressed PCS data stream is received by the PCS 42, MAC packet delineation can be performed by examining the length field 68 of each successive MAC packet 66 to locate the first bit of the next packet 66. The data stream can then be further processed to insert an inter-frame gap of a predetermined length between successive packets 66. Preferably, the inserted inter-frame gap has a length of not more than eleven octets.

Figure 8:
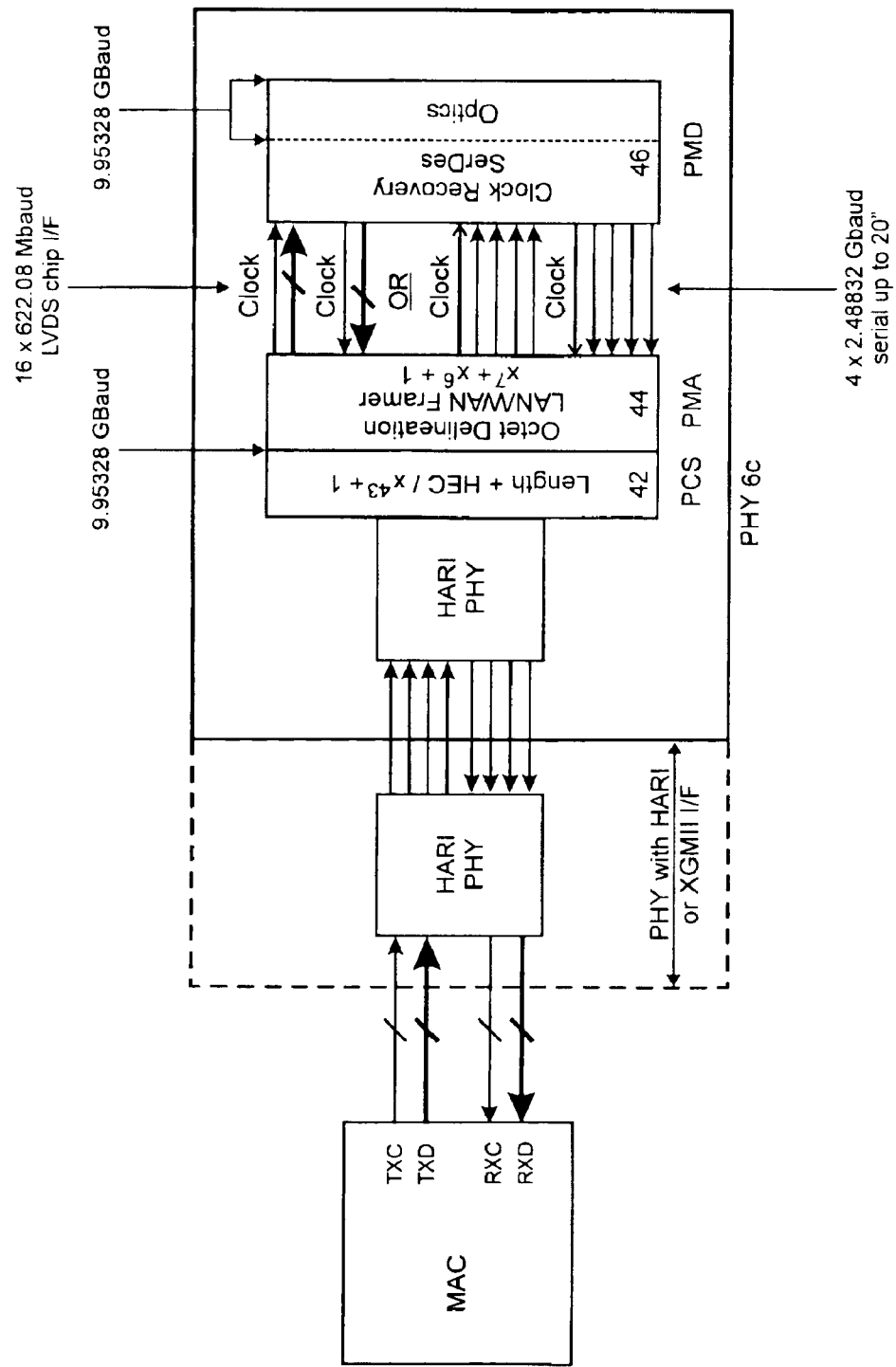
FIG. 8 is a block diagram schematically illustrating a physical layer interface in accordance with an alternative embodiment of the present invention.

FIG. 8 shows an alternative embodiment of the interface of the present invention. In this case, the physical coding sub-layer 42 and physical medium attachment sub-layer 44 are implemented within a single device. The physical medium dependent sub-layer 46 is implemented as a second device, and a communications bus 70 is provided to interconnect these two devices. In one embodiment, the communications bus 70 comprises a multi-lane parallel bus running at a standard lower-speed SONET lint rate. In the illustrated embodiment, the communications bus 70 is implemented as a four-lane parallel bus running at a standard SONET STS-48 line rate of 2.48832 Gbaud. This bus 70 can be implemented using copper connections with a reach of up to twenty inches, without significantly degrading data transmission reliability. In use, the synchronous container 60 can be distributed (i.e. inverse multiplexed using, for example a conventional bit-slicing technique) across each of the lanes of the communications bus 70 by the physical medium attachment sub-layer 44 and transmitted to the physical medium dependent layer 46 for transport across the network medium 4. If desired, the multi-lane data transmission bus 70 can be propagated through the network medium 4 by transmitting the data streams in each of the lanes through the network medium 4 using respective different channels (e.g. wavelengths or fibers) running at a suitable conventional line rate (e.g. OC-48 in the case of the four-lane communications bus 70 illustrated in FIG. 8). In this case, the A1 and A2 octets of the synchronous container can be used to realign the respective data streams received through each of the channels at the destination node. In particular, by bit-slicing the synchronous container across multiple lanes, the respective data stream transmitted/received through each channel will each contain an A1/A2 octet transition, which will be at an identical position within each data stream. Thus a receiving physical medium dependent layer 46 can use the A1/A2 transition to bit-align the received data streams with each other using techniques known in the art, such as, for example, by buffering each data stream in a respective elastic store (not shown) and adjusting a read pointer based on the detected location of the A1/A2 transition within the respective data stream. The thus bit-wise aligned data streams can then be multiplexed (e.g. using a conventional bit-interleaving technique) to recover the original synchronous container.

In an alternative embodiment, a conventional 16 bit low voltage differential signal (LVDS) chip interface can be used between the physical medium dependent layer 46 and the physical medium attachment layer 44.

Based on the foregoing, it will be seen that the present invention provides a technique for transmitting high speed Ethernet data streams across a packet switched physical network medium 4. The present invention utilizes a common physical medium dependent interface 46 that can be used independently of the LAN/WAN configuration of the network. Additionally, data rates compatible with conventional SONET payload rates are obtained in a WAN configuration, while a data rate of 10 Gb/s is obtained in the LAN configuration.

The embodiment(s) of the invention described above is(are) intended to be exemplary only. The scope of the invention is therefore intended to be limited solely by the scope of the appended claims.

We claim:

1. A method of transporting a high speed Ethernet data stream comprising a sequential series of media access control (MAC) frames and having a data rate of 10 Gb/s across a synchronous packet switched network fabric having a line rate of 9.953280 Gbaud, the method comprising the steps of:
    a) providing a synchronous container at a sending interface, the synchronous container having a line/column frame format conforming to a conventional synchronous optical network (SONET) frame format, and a stripped transport overhead (TOH) wherein the stripped TOH comprises only A1 and A2 octets of a conventional SONET frame TOH;
    b) compressing the Ethernet data stream to produce a compressed data stream;
    c) mapping the compressed data stream to the synchronous container; and
    d) launching the synchronous container across the network fabric toward a receiving interface.

2. A method as claimed in claim 1, wherein the frame format of the synchronous container conforms to a SONET synchronous transport signal-level 192 (STS-192C) frame format.

3. A method as claimed in claim 1, wherein the stripped TOH comprises a predetermined number of each of the A1 and A2 octets.

4. A method as claimed in claim 3, wherein the predetermined number is 24 or less.

5. A method as claimed in claim 1, wherein the step of compressing the Ethernet data stream comprises a step of removing an inter-frame gap (IFG) between successive MAC frames.

6. A method as claimed in claim 5, wherein the step of compressing the Ethernet data stream further comprises a step of removing idle MAC frames from the Ethernet data stream.

7. A method as claimed in claim 1, wherein the step of mapping the compressed data stream to the synchronous container comprises adding successive frames of the compressed data stream directly to the SONET/SDH frame.

8. A method as claimed in claim 7, wherein successive MAC frames of the compressed data stream are added to the synchronous container starting immediately following the stripped TOH.

9. A method as claimed in claim 1, wherein the step of launching the synchronous container comprises steps of:
    a) inverse multiplexing the synchronous container into a plurality of data streams; and
    b) launching each of the data streams into a respective channel of the network fabric.

10. A method as claimed in claim 1, further comprising the steps of:
    a) receiving a synchronous container from the sending interface;
    b) extracting the compressed data stream from the synchronous container; and
    c) decompressing the compressed data stream to recover the original Ethernet data stream.

11. A method as claimed in claim 10, wherein the synchronous container is inverse multiplexed across a plurality of channels of the network fabric, and the step of receiving the synchronous container comprises steps of:
    a) receiving a respective data stream through each one of the plurality of channels;
    b) aligning each of the received data streams; and
    c) multiplexing the aligned data streams to recover the synchronous container.

12. A method as claimed in claim 10, wherein the step of extracting the compressed data stream from the synchronous container comprises the steps of:
    a) synchronizing a read clock with the synchronous container; and
    b) reading successive MAC frames of the compressed data stream from the synchronous container starting immediately following a transport overhead (TOH) of the synchronous container.

13. A method claimed in claim 12, wherein the step of synchronizing a read clock with the synchronous container comprises detecting a transition between A1 and A2 octets of the TOH.

14. A method as claimed in claim 10, wherein the step of decompressing the compressed data stream comprises a step of inserting an inter-frame gap (IFG) between successive MAC frames.

15. A method as claimed in claim 14, wherein the step of inserting an IFG between successive MAC frames comprises the steps of:
   a) monitoring a preamble portion of a first MAC frame;
   b) reading a length of a data portion of the first MAC frame from the monitored preamble portion, to identify a trailing byte of the first MAC frame; and
   c) inserting an idle MAC frame into the compressed stream immediately following the identified trailing byte.

16. A method of interfacing a local area network (LAN) having a 10 Gb/s data rate and a synchronous packet switched physical network fabric having a line rate of 9.953280 Gbaud, the method comprising steps of:
   a) receiving an Ethernet data stream comprising a sequential series of media access control (MAC) frames;
   b) compressing the Ethernet data stream; and
   c) mapping the compressed Ethernet data stream to a synchronous container of the synchronous packet switched physical network fabric, the synchronous container having a line/column frame format conforming to a conventional synchronous optical network (SONET) frame format, and a stripped transport overhead (TOH) wherein the stripped TOH comprises only A1 and A2 octets of a conventional SONET frame TOH.

17. A method as claimed in claim 16, wherein the frame format of the synchronous container conforms to a SONET synchronous transport signal-level 192 (STS-192C) frame format.

18. A method as claimed in claim 16, wherein the stripped TOH comprises a predetermined number of each of the A1 and A2 octets.

19. A method as claimed in claim 18, wherein the predetermined number is 24 or less.

20. A method as claimed in claim 16, wherein the step of compressing the Ethernet data stream comprises a step of removing an inter-frame gap (IFG) between successive MAC frames.

21. A method as claimed in claim 20, wherein the step of compressing the Ethernet data stream further comprises a step of removing idle MAC frames from the Ethernet data stream.

22. A method as claimed in claim 16, wherein the step of mapping the compressed data stream to the synchronous container comprises adding successive MAC frames of the compressed data stream directly to the synchronous container.

23. A method as claimed in claim 22, wherein successive MAC frames of the compressed data stream are added to the synchronous container starting immediately following the stripped TOH.

24. A method as claimed in claim 16, comprising the steps of:
   a) receiving a synchronous container encapsulating a compressed Ethernet data stream;
   b) extracting the compressed Ethernet data stream from the received synchronous container; and
   c) decompressing the compressed Ethernet data stream.

25. A method as claimed in claim 24, wherein the step of extracting the compressed Ethernet data stream from the received synchronous container comprises the steps of:
   a) synchronizing a read clock with the received synchronous container; and
   b) reading successive MAC frames of the compressed Ethernet data stream from the received synchronous container starting immediately following a transport overhead (TOH) of the received synchronous container.

26. A method as claimed in claim 25, wherein the step of synchronizing a read clock with the received synchronous container comprises detecting a transition between A1 and A2 octets of the TOH.

27. A method as claimed in claim 24, wherein the step of decompressing the compressed Ethernet data stream comprises a step of inserting an Inter-frame gap (IFG) between successive MAC frames.

28. A method as claimed in claim 27, wherein the step of inserting an IFG between successive MAC frames comprises the steps of:
   a) monitoring a preamble portion of a first MAC frame;
   b) reading a length of a data portion of the first MAC frame from the monitored preamble portion, to identify a trailing byte of the first MAC frame; and
   c) inserting an idle MAC frame into the compressed Ethernet data stream immediately following the identified trailing byte.

29. An interface for coupling a local area network (LAN) having a 10 Gb/s data rate to a synchronous packet switched physical network fabric having a line rate of 9.953280 Gbaud, the interface comprising:
   a) means for receiving an Ethernet data stream comprising a sequential series of media access control (MAC) frames;
   b) means for compressing the Ethernet data stream; and
   c) means for mapping the compressed Ethernet data stream to a synchronous container of the synchronous packet switched physical network fabric, the synchronous container having a line/column frame format conforming to a conventional synchronous optical network (SONET) frame format, and a stripped transport overhead (TOH) wherein the stripped TOH comprises only A1 and A2 octets of a conventional SONET frame TOH.

30. An interface as claimed in claim 29, wherein the frame format of the synchronous container conforms to a SONET synchronous transport signal-level 192 (STS-192C) frame format.

31. An interface as claimed in claim 29, wherein the stripped TOH comprises a predetermined number of each of the A1 and A2 octets.

32. An interface as claimed in claim 31, wherein the predetermined number is 24 or less.

33. An interface as claimed in claim 29, wherein the means for compressing the Ethernet data stream comprises means for removing an inter-frame gap (IFG) between successive MAC frames.

34. An interface as claimed in claim 33, wherein the means for compressing the Ethernet data stream further comprises means for removing idle MAC frames from the Ethernet data stream.

35. An interface as claim 29, wherein claimed in the means for mapping the compressed data stream to the synchronous container comprises means for adding successive MAC frames of the compressed data stream directly to the synchronous container.

36. An interface as claimed in claim 35, wherein successive MAC frames of the compressed data stream are added to the synchronous container starting immediately following the stripped TOH.

37. An interface as claimed in claim 29, further comprising:
   a) means for receiving a synchronous container encapsulating the compressed Ethernet data stream;
   b) means for extracting the compressed Ethernet data stream from the received synchronous container; and
   c) means for decompressing the compressed Ethernet data stream.

38. An interface as claimed in claim 37, wherein the means for extracting the compressed Ethernet data stream from the received synchronous container comprises:
   a) means for synchronizing a read clock with the received synchronous container; and
   b) means for reading successive MAC frames of the compressed Ethernet data stream from the received synchronous container starting immediately following a transport overhead (TOH) of the received synchronous container.

39. An interface as claimed in claim 38, wherein the means for synchronizing a read clock with the received synchronous container comprises means for detecting a transition between A1 and A2 octets of the TOH.

40. An interface as claimed in claim 37, wherein the means for decompressing the compressed Ethernet data stream comprises means for inserting an Inter-frame gap (IFG) between successive MAC frames.

41. An interface as claimed in claim 40, wherein the means for inserting an IFG between successive MAC frames comprises:
   a) means for monitoring a preamble portion of a first MAC frame;
   b) means for reading a length of a data portion of the first MAC frame from the monitored preamble portion, to identify a trailing byte of the first MAC frame; and
   c) means for inserting an idle MAC frame into the compressed Ethernet data stream immediately following the identified trailing byte.

* * * * *

UNITED STATES PATENT AND TRADEMARK OFFICE
CERTIFICATE OF CORRECTION

PATENT NO. : 6,944,163 B2
APPLICATION NO. : 09/739385
DATED : September 13, 2005
INVENTOR(S) : Paul A. Bottorff et al.

It is certified that error appears in the above-identified patent and that said Letters Patent is hereby corrected as shown below:

Column 11,
Line 63, after "16," and before "comprising" insert -- further --.

Column 12,
Line 65, after "as" and before "claim" insert -- claimed in --.
Line 65, after "wherein" delete "claimed in".

Signed and Sealed this

Fourth Day of July, 2006

JON W. DUDAS
*Director of the United States Patent and Trademark Office*